United States Patent

Koch et al.

[11] Patent Number: 5,958,273
[45] Date of Patent: Sep. 28, 1999

[54] INDUCTION HEATED REACTOR APPARATUS

[75] Inventors: Theodore A. Koch, Wilmington, Del.; Karl Robert Krause, Orange, Tex.; Mehrdad Mehdizadeh; Sourav Kumar Sengupta, both of Wilmington, Del.; Benny Earl Blackwell, Newark, Del.

[73] Assignee: E. I. du Pont de Nemours and Company, Wilmington, Del.

[21] Appl. No.: 08/887,548

[22] Filed: Jul. 3, 1997

Related U.S. Application Data

[63] Continuation-in-part of application No. 08/693,728, Aug. 7, 1996, abandoned, which is a continuation of application No. 08/189,471, Feb. 1, 1994, abandoned.

[51] Int. Cl.$^6$ ............................................. H05B 6/26
[52] U.S. Cl. ........................... 219/651; 423/376; 502/185
[58] Field of Search ................................... 219/618, 628, 219/629, 635, 649, 651, 654, 656; 502/185; 423/376

[56] References Cited

U.S. PATENT DOCUMENTS

| | | |
|---|---|---|
| 3,934,117 | 1/1976 | Schladitz . |
| 4,469,508 | 9/1984 | Amouroux et al. ............... 219/121.36 |

*Primary Examiner*—Tu Ba Hoang

[57] ABSTRACT

An improved induction heated reactor apparatus involving a reaction zone with inlet and outlet and containing an array of electrically conductive catalyst entities (susceptor entities) comprising pellets, rings, or rods containing a core externally coated with a substantially uniform and complete catalyst metal (e.g., platinum, platinum-iridium alloy, or platinum-rhodium alloy) wrap, coating, or surface impregnated, or containing the catalyst metal as a foam which are inductively heated to produce chemical product from a catalytic reaction. Such an apparatus is particularly useful in the catalytic generation of HCN at elevated temperatures.

15 Claims, 10 Drawing Sheets

5,958,273

1

INDUCTION HEATED REACTOR APPARATUS

CROSS-REFERENCE TO RELATED APPLICATIONS

This application is a continuation-in-part of application Ser. No. 08/693,728 fled Aug. 7, 1996, now abandoned which in turn is a continuation of application Ser. No. 08/189,471 filed Feb. 1, 1994, now abandoned.

FIELD OF THE INVENTION

The present relates to improved apparatus for carrying out induction heating processes.

BACKGROUND OF THE INVENTION

Induction heating has been used industrially for a number of years primarily to heat treat and to melt metals. Frequencies used range from AC power line frequencies of 50 or 60 Hz all the way up to about 30 MHz. It is well-known that an electrically conductive material may be inductively heated by placing the material in an alternating magnetic field. Such a material, when inductively heated, is known as a "susceptor". As the magnetic field intensity changes, eddy currents are induced in the susceptor material. Because of resistive losses in the susceptor material these eddy currents heat the material. The frequency at which the magnetic field alternates, the physical size and shape of the susceptor material, its electrical resistance, and in the case of magnetic materials, hysteresis losses of the material, affect the manner in which the susceptor material is heated. The manner in which the magnetic field interacts with a susceptor material is well understood. A conduction path must exist in the susceptor material in a plane approximately normal to the direction of the magnetic field for efficient inductive heating to take place.

A common arrangement for induction heating of a workpiece is to surround the workpiece with a long circuit solenoid-type coil. As current flows through this coil a magnetic field is created. The magnetic field is substantially uniform within the coil and is directed substantially parallel to the axis of the coil. If the coil is energized by an alternating current source, eddy currents are induced in the workpiece. In the situation where a solid workpiece is induction heated, the eddy currents at the surface of the workpiece reduce the intensity of the magnetic field within the interior of the workpiece, thus creating a gradient in the field intensity. This results in weaker eddy currents flowing within the interior of the workpiece than at the surface. The magnitude of this gradient is frequency dependent and also dependent upon the resistivity of the material being heated. At higher frequencies the surface of a solid material is heated much more than its interior region. This phenomenon is also known as the "skin effect". At lower frequencies the workpiece is heated in a more uniform manner. It is common practice to describe a parameter known as the "reference depth" to describe an "equivalent sleeve" which characterizes the so-called "skin effect" in solid objects.

SUMMARY OF THE INVENTION

The present invention relates to improved fluid phase reaction apparatus for producing chemical products from a reaction that at least initially requires heat-input. In general the apparatus comprises a reaction zone having an inlet port and an outlet port. The reaction zone contains an array of electrically conductive catalyst entities, and is in close proximity to an induction heating device. An external source of alternating current electrical power is connected to an induction heating device so as to create a region of high intensity alternating magnetic field throughout the reaction zone, thereby heating said catalysts entities substantially uniform.

In accordance with the present invention, said catalyst entities are heated inductively directly. As a result, the array of discrete catalyst entities is heated substantially uniformly throughout its entire mass; i.e. the catalyst entities at the center of said array are heated to substantially the degree as are those on the periphery thereof. Because said array of catalyst entities is heated substantially uniformly, the chemical reaction, which the catalyst entities promote, proceeds more uniformly and efficiently; moreover, it does so without it being necessary to provide as much total heat to the reaction. Furthermore, the apparatus of this invention can control the temperature of the chemical reaction with a whole lot greater facility than the apparatus of the prior art wherein the catalyst is not heated directly by induction heating. Thus in the prior art, the walls of the reaction vessel are heated by induction heating or other heating means, and the heat of the reaction vessel is transmitted to the reactants and the catalyst by conduction and/or radiation.

DETAILED DESCRIPTION OF THE INVENTION

Figure 1:
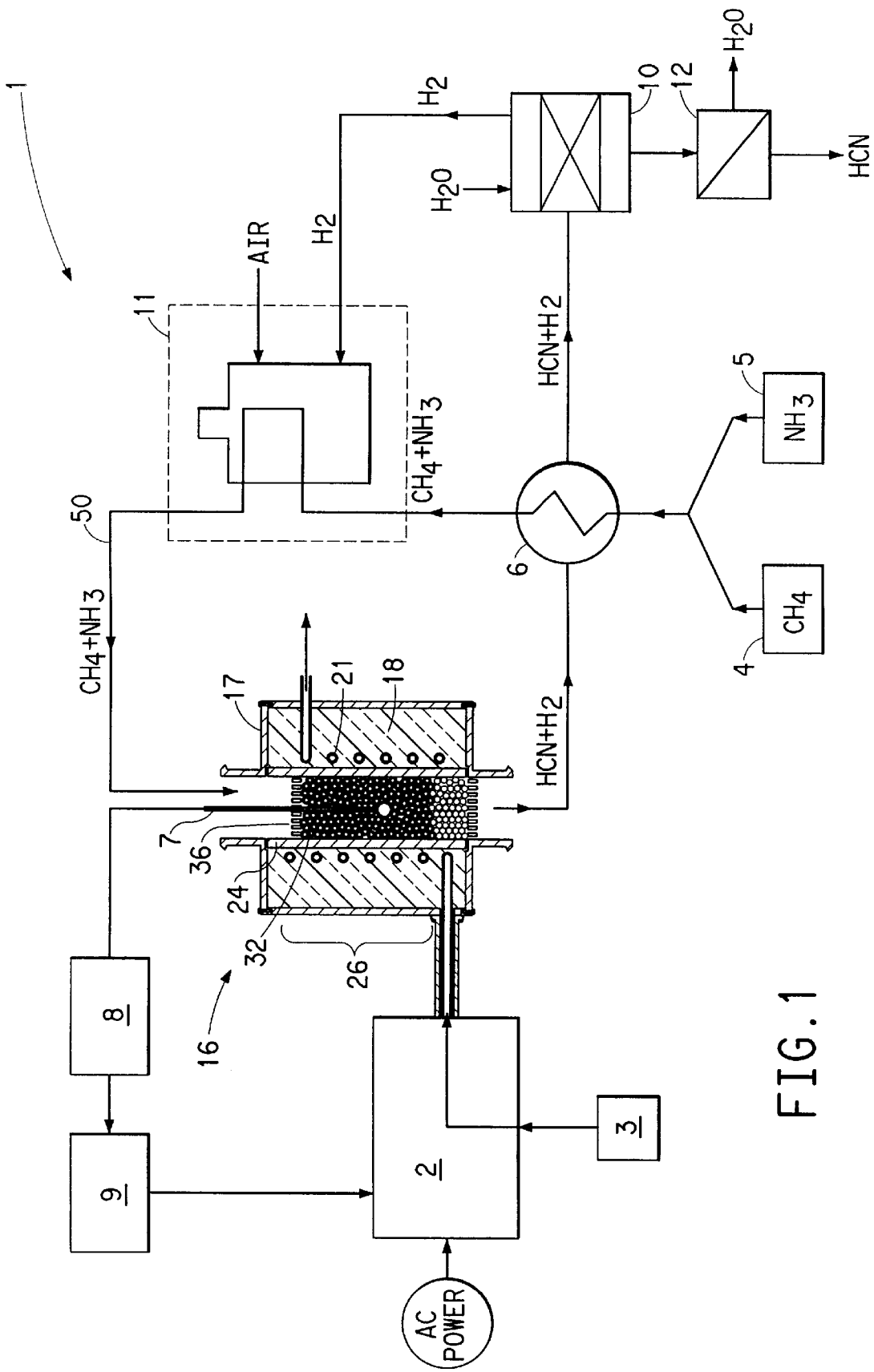
FIG. 1 is a schematic diagram showing a first reaction system utilizing a reactor of the present invention.

In an embodiment of the fluid phase reaction apparatus of this invention, the induction heating device comprises an induction heating coil. An electrically non-conductive annular partition is positioned concentrically within said induction coil said partition defining a reaction zone containing a catalyst bed which comprises a three-dimensional array of discrete electrically conductive catalyst entities. An external source of alternating current electrical power is connected to said induction heating coil so as to create a region of substantially uniform high intensity magnetic field within said reaction zone. The array of discrete electrically conductive catalyst entities is uniformly heated by the high intensity magnetic field.

More particularly, the apparatus of this invention comprises an external reactor casing to contain the reactants. The reactor casing has an inlet port for conveying fluid reactants into the reactor and an outlet port for conveying fluid reaction products out of the reactor. A tubular induction heating coil is positioned within said external casing. A first electrically non-conductive annular partition positioned within said induction heating coil defines a reaction zone. The reaction zone is a region of high alternating magnetic field intensity within said induction heating coil and the reaction zone is in communication with said inlet port to receive fluids and in communication with said outlet port to discharge fluids. A source of alternating current electrical power connected to said induction heating coil creates a region of high intensity alternating magnetic field in the reaction zone by alternating magnetic induction. The reaction zone comprises a catalyst bed containing an array of electrically conductive catalyst entities which are heated by said high intensity magnetic field which is created by said induction heating coil.

In a more particular embodiment, there is an annular thermal insulating region within the external reactor casing. The induction heating coil is tubular, and it is positioned within the annular insulating region. An annular partition positioned within the induction coil defines the reaction zone. A source of coolant is provided to remove heat from the induction coil. An external source of alternating current electrical power is connected to the induction heating coil for the purpose of creating a region of high intensity magnetic field within the reaction zone. The catalyst entities can be supported within the reaction zone by an electrically non-conductive support entities, which can in turn be supported on a grid which is outside the region of high intensity alternating magnetic field. The external casing of the reactor is outside of, and spaced away from, the induction heating coil so as to minimize inductive heating of the casing and to avoid reducing the magnetic field intensity in the reaction zone. Although any shape casing can be employed in the present invention, a substantially cylindrical, metallic casing is most preferred.

The annular region of high-temperature insulation comprises one or more layers of insulation, such as a refractory ceramic fiber (RCF). The RCF can typically be composed of alumina, silica, zirconia, or mixtures of the same, and it can be in the form of whiskers, continuous filaments, loose wool or in the form of a blanket or felt. The induction coil is located in a concentric manner within the annular region of insulating material and is preferably embedded in a layer of cast ceramic. The induction coil is positioned in close proximity to the annular partition, and typically is made of a material able to withstand especially high temperatures. In this arrangement the annular partition which defines the reaction zone does not have to be constructed to contain the reactants, since the external casing provides this containment. The partition material may be selected primarily for the desired thermal properties, which allows the use of ceramics which may not have sufficient mechanical strength to otherwise contain the reactants, particularly at elevated temperatures and/or elevated pressures that might be required to carry out certain chemical reactions. The pressure within the external reactor casing but outside the reaction zone may be maintained at a pressure sufficient to minimize or even elevated pressure related stresses on the annular partition. Problems with sealing the ends of the annular partition are thus also obviated. The annular region within the external reactor casing but outside the reaction zone is typically connected to the reaction zone by a passage that permits reactants to enter this annular region so that no net pressure is exerted on the annular partition.

DETAILED DESCRIPTION OF THE DRAWINGS

FIG. 1 shows a first typical reaction system 1, useful for chemical reactions that require a catalyst and which occur at elevated temperatures, such as the generation of HCN, which is exemplary of the present invention. Reaction system 1 comprises a power supply 2, a coolant source 3, a first source 4 of a first feed gas, a second source 5 of a second fed gas, a heat exchanger 6, a temperature probe 7 and associated temperature measuring system 8, a feedback controller 9, a gas/liquid separator 10, an energy recovery unit 11, a product separator 12, and a reactor 16 (in section). Power supply 2 receives AC line voltage and generates AC power of a suitable frequency for induction heating. Gasses from first source 4 and second source 5 are mixed together using conventional metering and mixing equipment (not shown) to form a mixture 50 which is then fed to reactor 16. Energy recovery unit 11 is implemented as a combustion unit which burns the hydrogen by-product of the reaction in air and uses the resulting heat to preheat the reactant gases prior to their entry into reactor 16. Reactor 16 comprises an external reactor casing 17, an annular insulating region 18, an induction coil 21, an annular partition 24 and a reaction zone 26. Reaction zone 26 is filled with a bed 32 of electrically conductive catalyst entities. The catalyst entities are induction heated by the varying magnetic field created by induction coil 21 to promote the chemical reaction.

Figure 2:
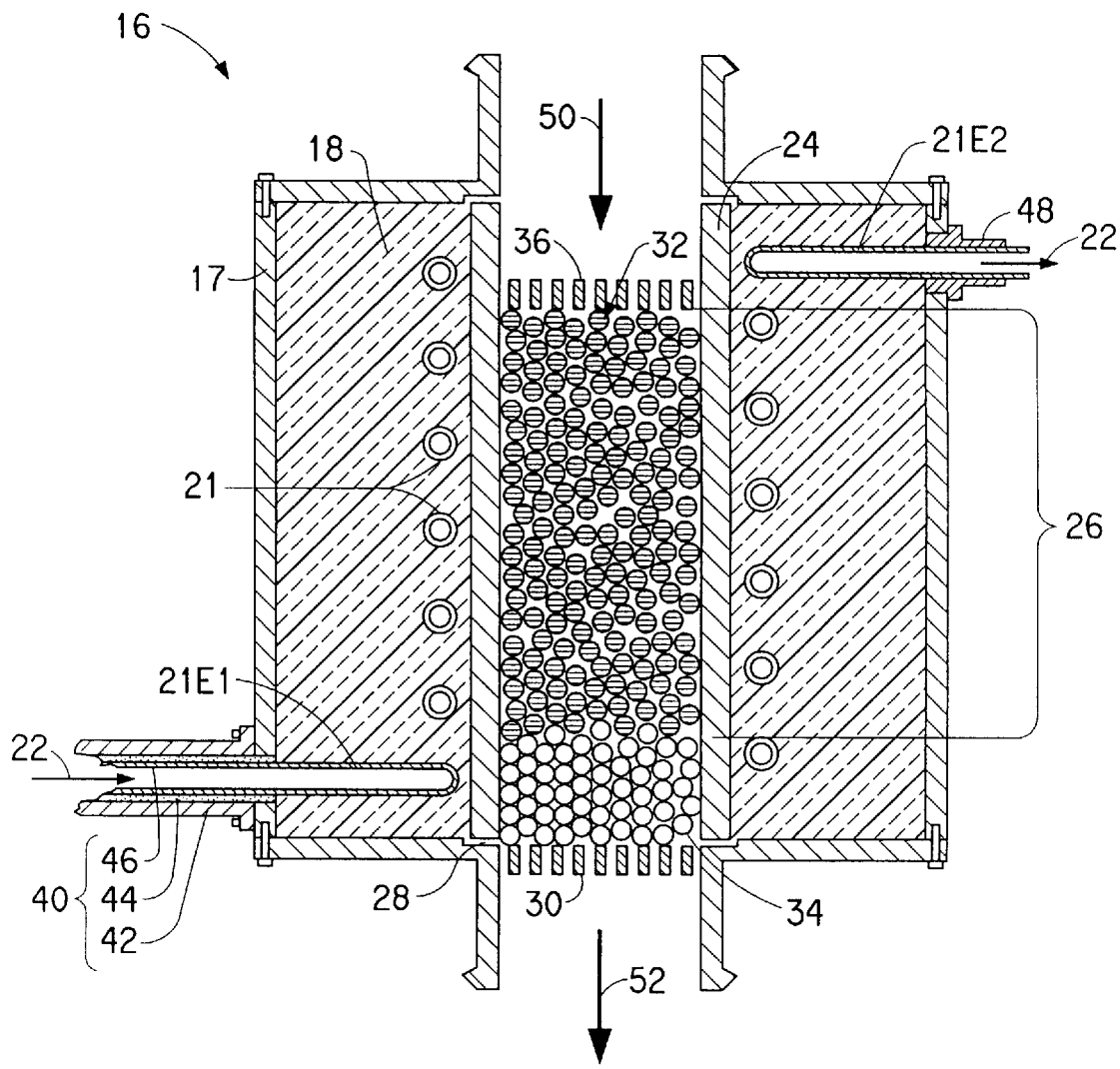
FIG. 2 is a sectional view of a first embodiment of the reactor.

FIG. 2 is a sectional view which provides a more detailed view of reactor 16. Induction coil 21 is made of a tubular conductor, through which a coolant 22 flows supplied by external coolant source 3 (not shown in FIG. 2; see FIG. 1). The region inside annular partition 24 that is surrounded by induction coil 21 defines reaction zone 26. A small gap 28 between annular partition 24 and casing 17 prevents pressure-related stresses on annular partition 24. A porous grid 30 supports a bed of susceptor entities 32 on support entities 34. As shown, support entities 34 comprise a bed of non-conductive entities, such as alumina spheres, but any other suitable electrically non-conductive support entities may be used, e.g. those of FIG. 7. This arrangement further comprises an electrically non-conducting porous plate 36 to contain the catalyst entities in the bed. A first end 21E1 of induction coil 21 is energized by the alternrating current power supply (not shown in FIG. 2; see 2, FIG. 1) through a coaxial line 40 comprising an outer jacket 42 which is electrically connected to casing 17, a dielectric layer 44, and a center conductor 46. A second end 21E2 of induction coil 21 is electrically connected to casing 17 by a ferrule 48 which serves as the electrical ground. Dielectric layer 44 of coaxial line 40 is comprised of a material having sufficient dielectric strength to withstand the voltage imposed between center conductor 46 and outer jacket 42 and which will withstand chemical attack from either fluid 50 entering reaction zone 26 or fluid 52 exiting reaction zone 26.

By "susceptor entity" as used herein, is rot pellets, rings, or rods, containing a core externally coated with a substantially uniform and complete catalytic metal wrap, coating, or surface impregnation, or containing the catalytic metal as a foam. The susceptor entities are distributed substantially uniformly within the reaction zone volume, physically disposed such that electrical conduction between the susceptor entities is minimal, but which allow uniform and turbulent flow of gas between said entities, and are positioned such that the largest eddy current path formed on them is substantially in the same plane as the flow of electric current in the induction coil. The susceptor entities comprise one or more metals from Groups Ib, IIb, IIIa, IVa & b, Vb, VIb, VIb, or VIII, hereinafter sometimes referred to as "catalytic metals". The term "catalytic metal" is also used hereinafter to describe the above-described metals or alloys thereof; particularly platinum, platinum-odium alloy, or platinum-rhodium alloy. The electrical conductivity between susceptor entities is substantially less than the surface conductivity of such entities. The susceptor entities must have sufficient electrical conductivity, and the size and geometry of said entities must be such that during heating by induction, said entities will include a sufficiently large eddy current path in the plane of the coil current to have sufficient induction heating efficiency and sufficient surface area efficiently to promote catalytic activity. The characterstics and use of said susceptor entities is disclosed in more detail in U.S. patent application No. 08/887,549 filed of even date herewith by Mehdizadeh et al. under Attorney Docket Number CH2642, the contents of which are incorporated herein by reference.

Figure 3:
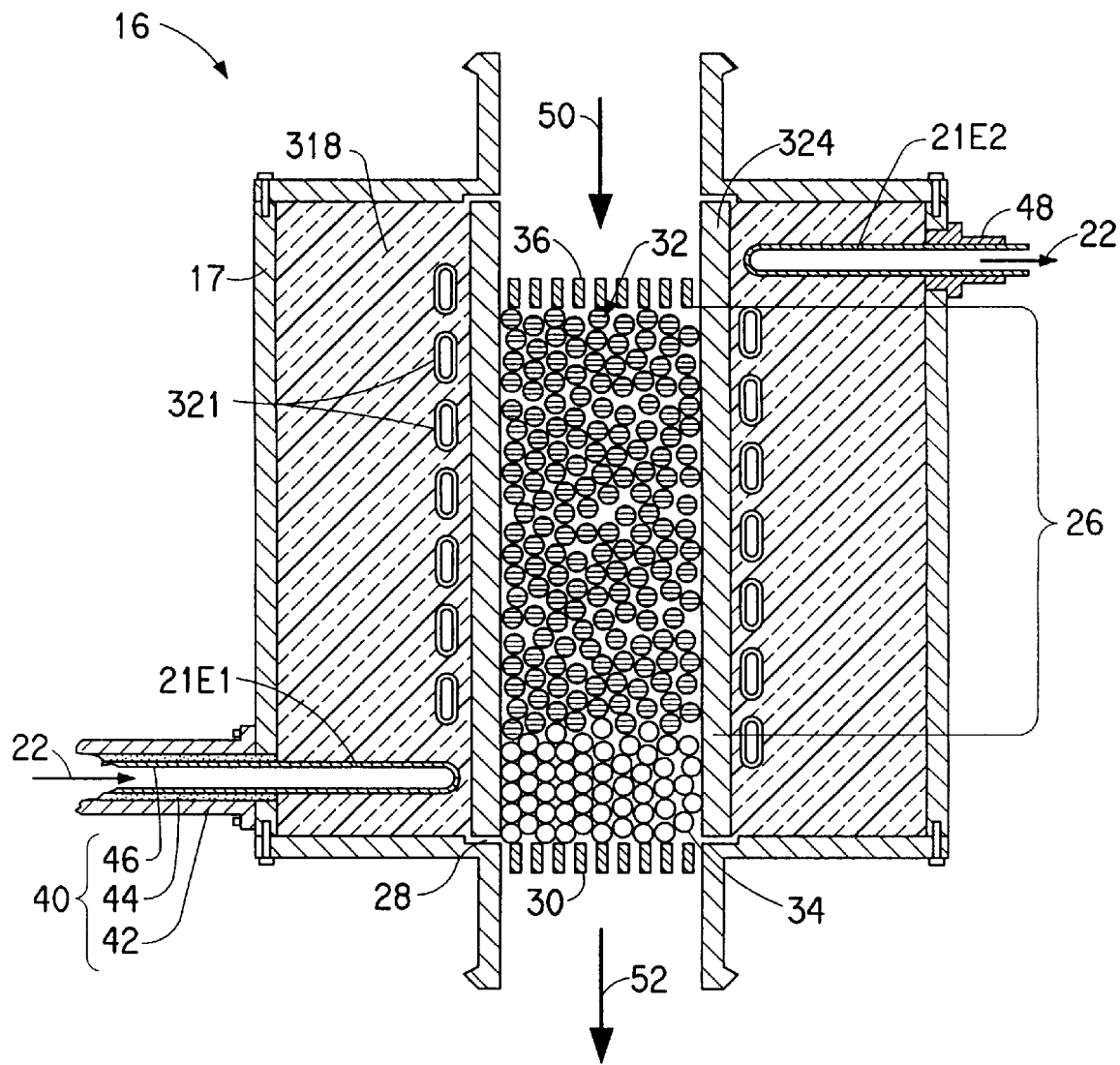
FIG. 3 is a sectional view of a second embodiment of the reactor.

FIG. 3 illustrates an embodiment of reactor 16 arranged to maximize thermal conductivity from reaction zone 26 to an induction coil 321. By minimizing the distance of induction coil 321 from reaction zone 26, by selecting high thermal conductivity materials for annular partition 324 and for an annular layer 318 in which induction coil 321 is positioned, and by utilizing an induction coil 321 having a cross-section of a fattened shape in the vertical plane and oriented to expose the maximum area to reaction zone 26, heat transfer from reaction zone 26 to induction coil 321 is maximized. In be case of an exothermic reaction, the current in induction coil 321 is reduced to zero as the temperature in the reaction chamber rises and the flow rate and temperature of coolant 22 within the induction coil are controlled to remove sufficient heat from reaction zone 26 to thus control the temperature within reaction zone 26. In the case of an exothermic reaction, the material of which the annular partition is made is selected so as to have a higher thermal conductivity and the induction coil is optionally configured to maximize its ability to remove heat from reaction zone 26, e.g. coil 321.

Figure 4:
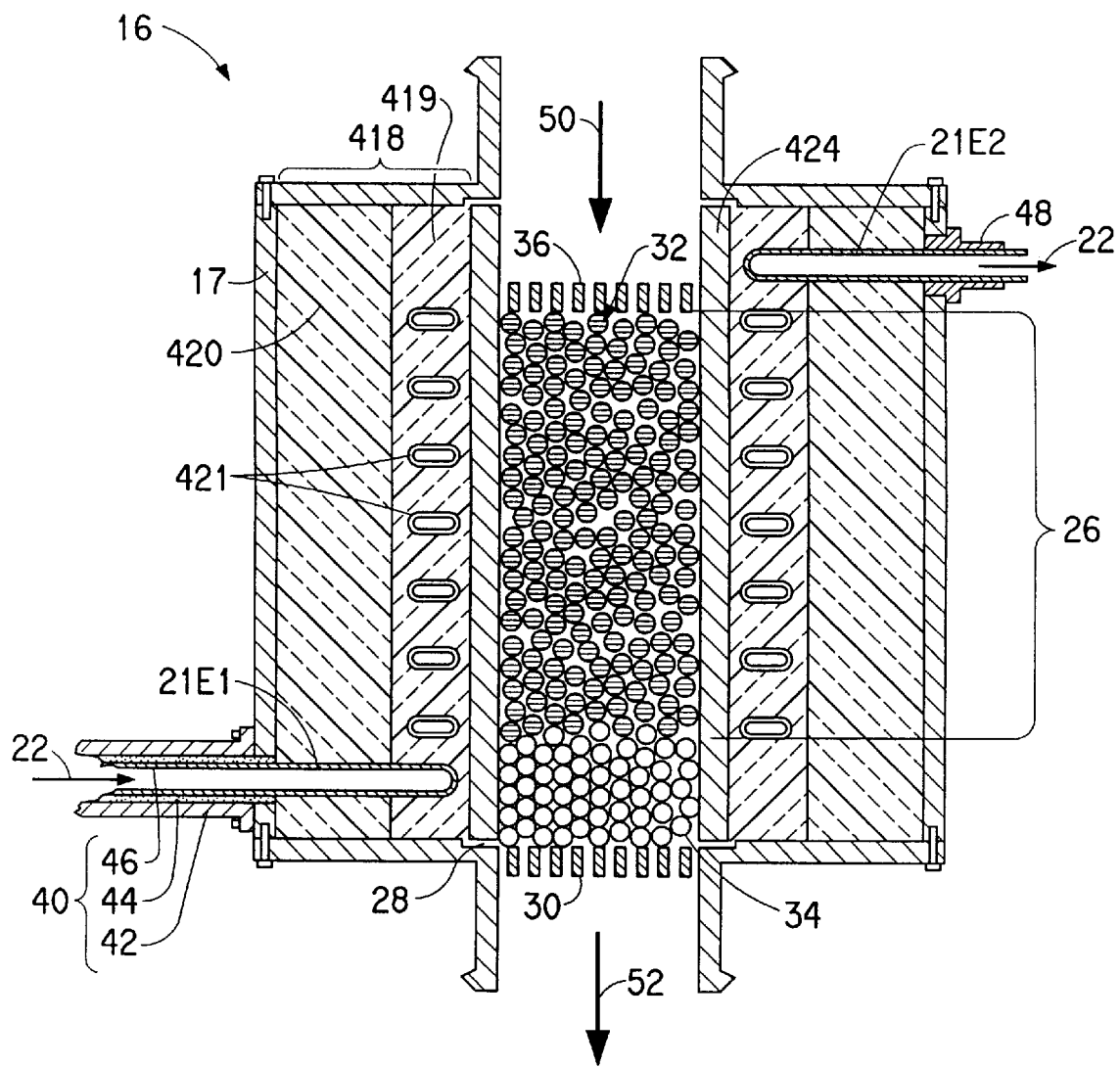
FIG. 4 is a sectional view of a third embodiment of the reactor.

FIG. 4 illustrates an embodiment of a reactor 16 arranged to minimize thermal conductivity from the reaction zone to the induction coil. Insulating region 418 is comprised of a first annular shell 419 and a second annular shell 420. Annular shell 419 will withstand high reaction temperatures; however, annular shell 420 provides greater thermal insulation. Induction coil 421 is positioned in annular shell 419 which surrounds an annular partition 424. The material of which annular partition 424 is composed should be chosen primarily for its chemical compatibility with the fluid reactants in the reaction zone, while the material making up annular shell 419 should be chosen for its compatibility with the material making up induction coil 421 and the thermal properties of the latter. When used in a system to produce HCN, an alumina ceramic material has been found suitable for annular partition 424 and a silica ceramic material has been found suitable for annular casting shell 419. Any good thermal insulation material can be used for annular shell 420. The rate of heat transfer out of reaction zone 26 can be minimized by the positioning of induction coil 421 in respect of reaction zone 26, by selecting lower thermal conductivity material for annular partition 424 and for annular layer 419, and by utilizing an induction coil 421 having a cross-section shape which minimizes the area facing reaction zone 26; e.g. it can be flattened in the horizontal plane. In the case of a highly endothermic reaction to be carried out in the reaction zone, the thermal conductivity and the thickness of the annular partition are selected to minimize heat loss from reaction zone 26. Since it is usually desirable to maintain the temperature of the induction coil below the temperature of reaction zone, the annular partition and the induction coil are optionally configured to minimize the heat that induction coil removes from reaction zone.

Figure 5:
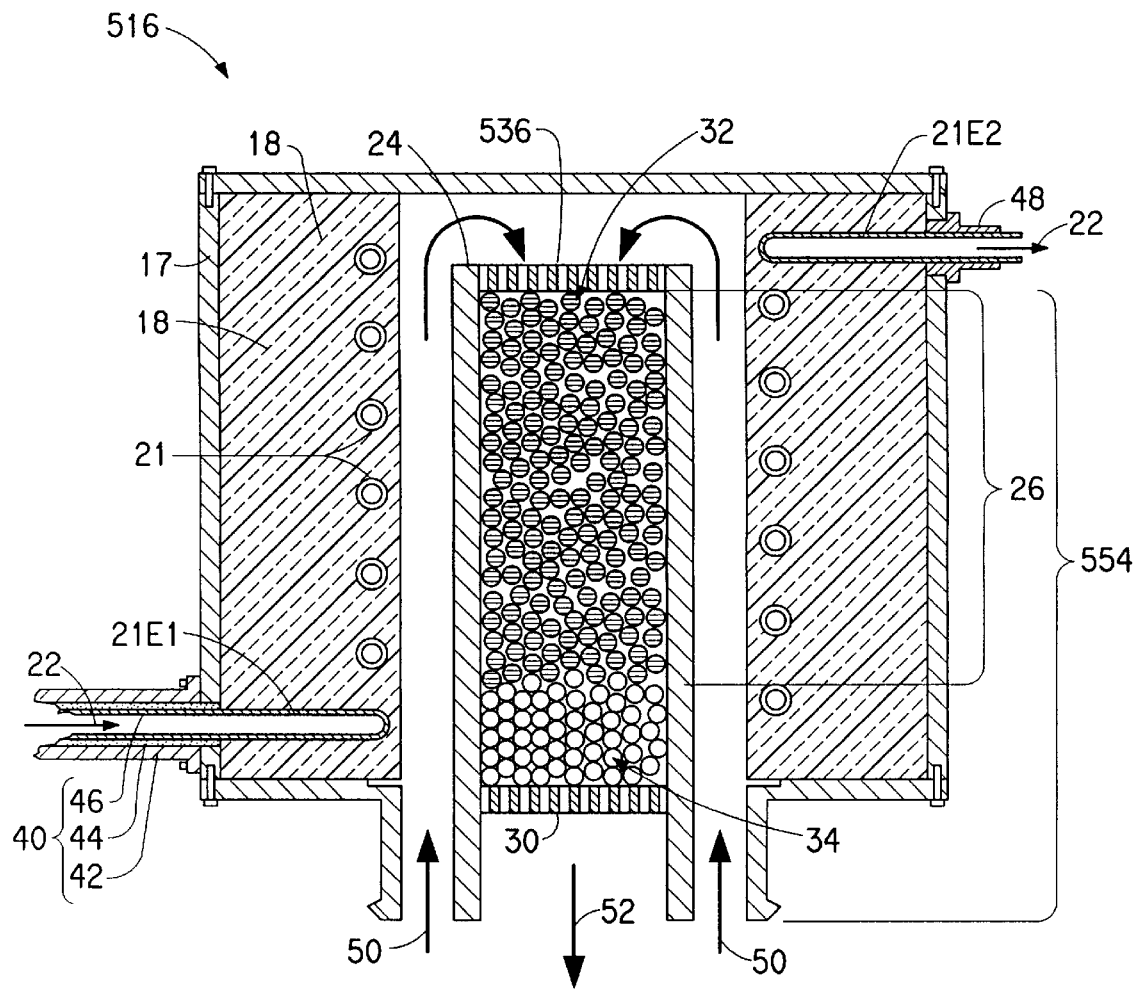
FIG. 5 is a sectional view of a fourth embodiment of the reactor.

FIG. 5 illustrates an embodiment of a reactor 516 arranged to exchange heat from reaction zone 26 to a pre-heat zone 554 so as to pre-heat the entering fluid mixture 50. The arrangement shown in FIG. 5 has both inlet port of reactor 516 and outlet port of reactor 516 arranged on the same end of reactor 516, the former accommodating entering fluid 50 and the latter accommodating exiting fluid 52. An arrangement which provides a downward flow through reaction zone 26 is shown. This arrangement further comprises an electrically non-conducting porous plate 36 to contain the catalyst entities in bed. An alternative arrangement of this embodiment of reactor 516, which provides an upward flow through reaction zone 26, is also contemplated but is not shown.

Figure 6:
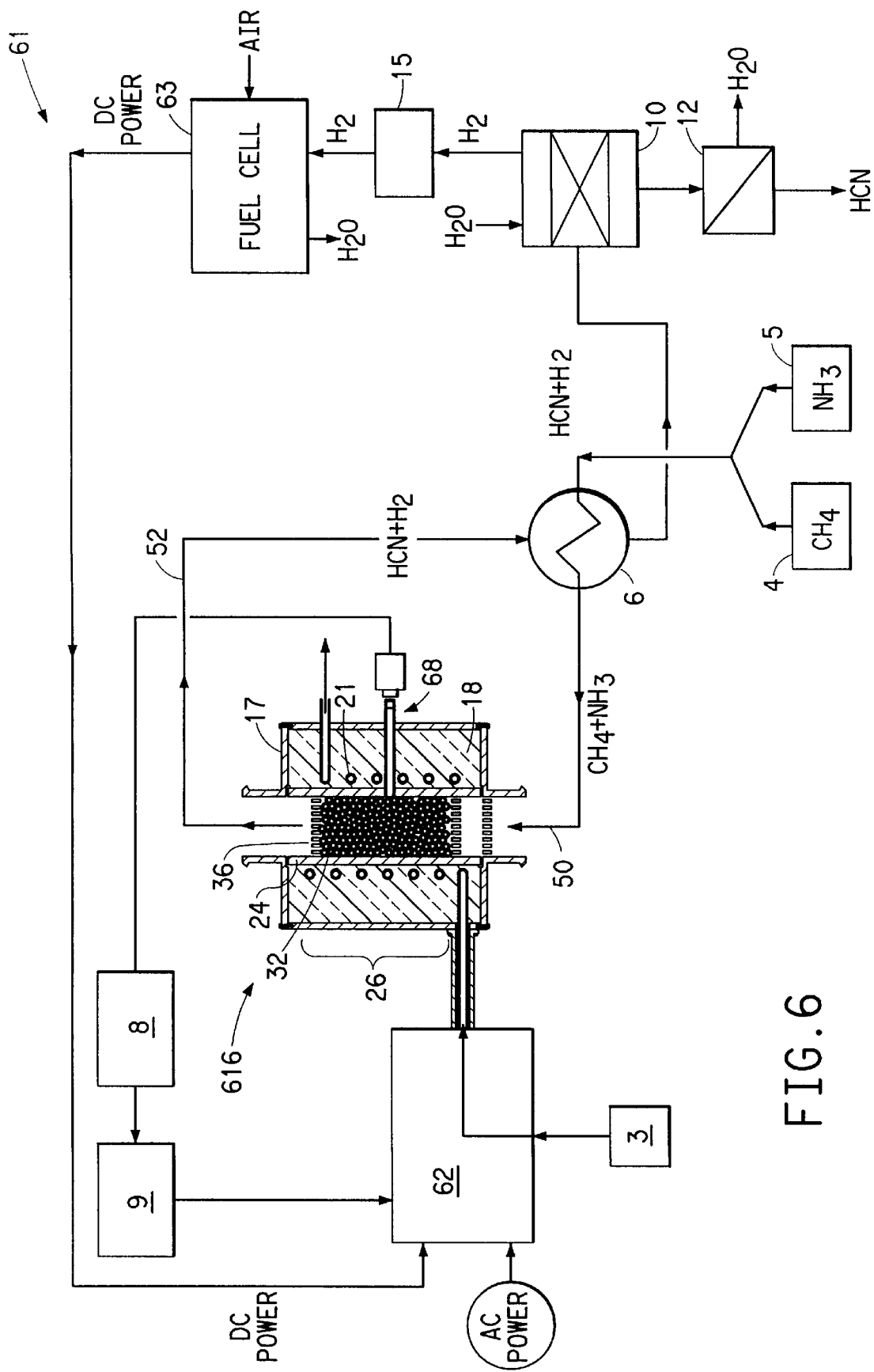
FIG. 6 is a schematic diagram showing a second reaction system utilizing a reactor of the present invention.

FIG. 6 shows a second typical reaction system 61, also useful for generation of HCN. The system 61 comprises a power supply 62, a coolant source 3, a first source 4 of air feed gas, a second source 5 of a second feed gas, a heat exchanger 6, a pyrometer type temperature probe 68 and associated temperature measuring system 8, a feedback controller 9, a gas/liquid separator 10, a hydrogen purifier 15, a fuel cell 63, a product separator 12, and a reactor 616. Fuel cell 63 generates DC power using the hydrogen by-product of the reaction and oxygen from air, and supplies this DC power to power supply 62. Power supply 62 receives either or both AC line voltage and/or DC voltage from fuel cell 63 and generates AC power at a suitable frequency for induction heating.

Figure 7:
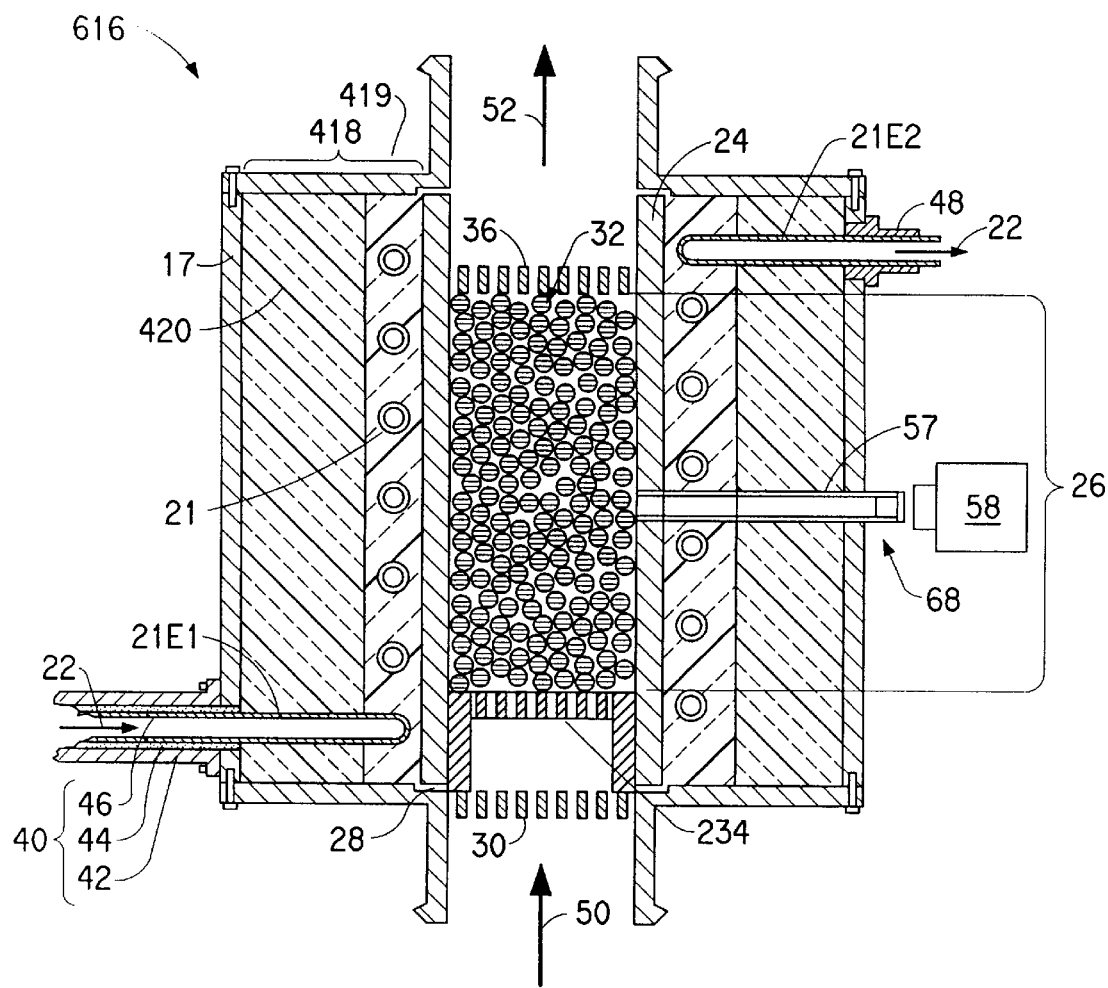
FIG. 7 is a sectional view of a fifth embodiment of the reactor.

FIG. 7 is a sectional view which provides a more detailed illustration of reactor 616 which is especially suited for endothermic reactions, where significant amounts of heat are required to drive the desired chemical reaction. An induction coil 21 is positioned in a thick annular layer 419 that serves as part of insulating region 418 and is bonded to an annular partition 24. The material making up annular partition 24 was chosen primary for its chemical compatibility with the fluid reactants in the reaction zone, while the material of which annular layer 419 is composed was chosen for its compatibility with the material of induction coil 21 and its thermal properties. When used in a system to produce HCN an alumina ceramic material has been found suitable for annular partition 24 and a silica ceramic material has been found suitable for annular casting layer 419. A pyrometer type temperature probe 68 comprising a viewing port 57 and a pyrometer head 58 monitors the temperature of catalyst entities 32 within reaction chamber 26. Support structure 234 is made up of an electrically non-conductive porous top surface supported by an annular side wall.

The reactor of FIG. 7 is particularly useful for reactions that require high temperatures to initiate, but which are substantially thermally neutral or even somewhat exothermic while the reaction is being carried out. In such situations the magnitude of current in induction coil 21 may be controlled by controller 9, FIG. 6, in response to temperature measurements made either within reaction chamber 26 itself as with temperature probe 7, FIG. 1, or in response to temperature measurements made with an optical pyrometer 68, FIG. 6, or in response to temperature measurement of the fluid stream exiting the reaction chamber (not shown).

Figure 8:
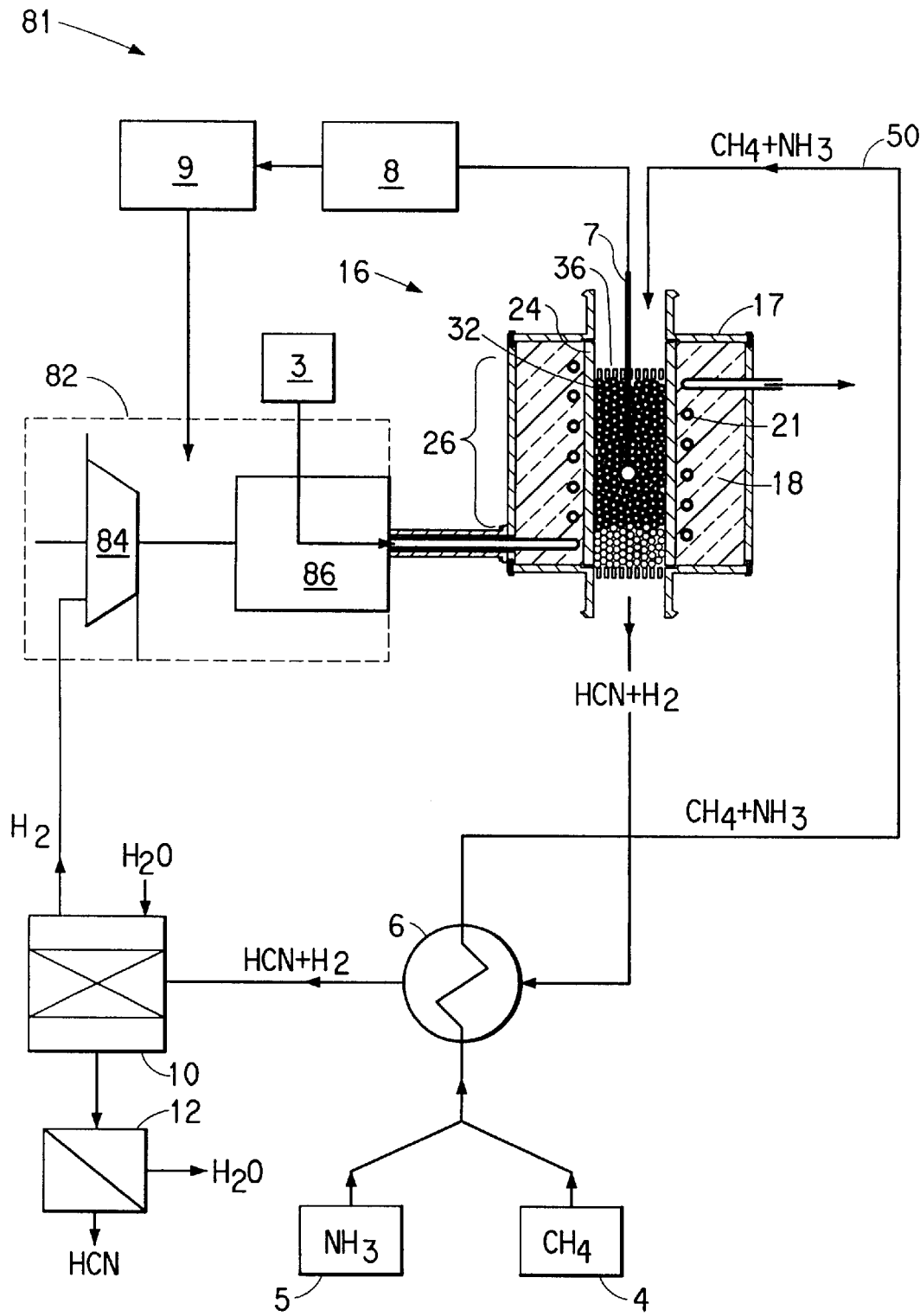
FIG. 8 is a schematic diagram showing a third reaction system.

FIG. 8 illustrates a third typical reaction system 81, also useful for generation of HCN. The system 81 comprises a power generating module 82, a coolant source 3, a first source 4 of a first feed gas, a second source 5 of a second feed gas, a heat exchanger 6, a temperature probe 7 and associated temperature measuring system 8, a feedback controller 9, a gas/liquid separator 10, a product separator and a reactor 16. Power generating module 82 comprises a gas turbine engine 84 which drives a generator 86 which generates power at the induction heating frequency. The power generating module 82 functions as an energy recovery unit by burning the hydrogen by-product of the reaction in air to power the gas turbine 84. The feedback controller 9 controls the output of generator 86 to maintain the desired temperature in the reaction zone 26. An optional additional heat exchanger (not shown) may be used to recover waste heat from the exhaust of the turbine engine 84 and further preheat the reactants in the mixture 50.

Figure 9:
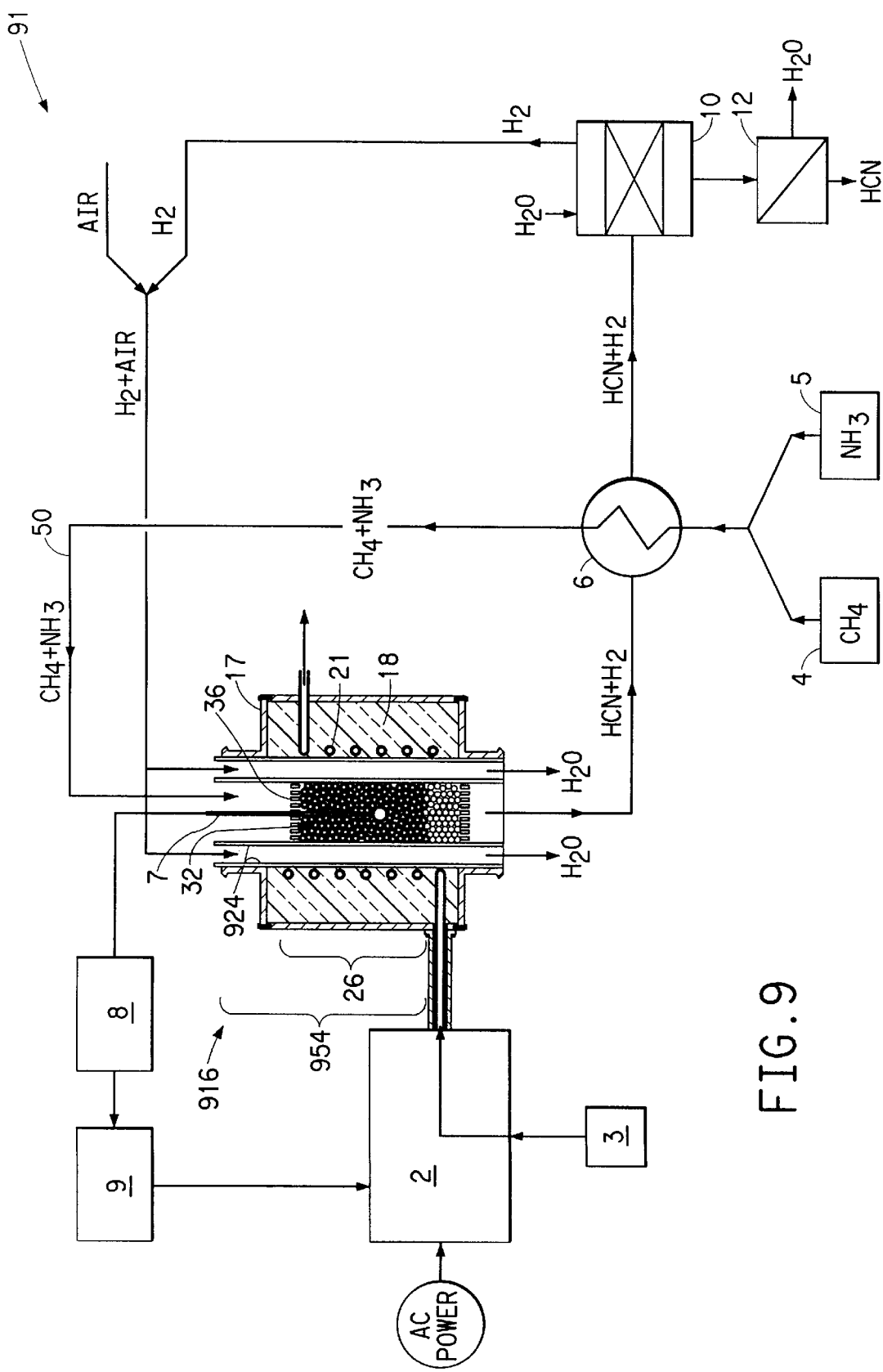
FIG. 9 is a sectional view of a sixth embodiment of the reactor.

FIG. 9 illustrates a fourth typical reaction system 91, also useful for generation of HCN which incorporates reactor 916. System 91 comprises a power supply 2, a coolant source 3, a first source 4 of a first feed gas, a second source 5 of a second feed gas, a heat exchanger 6, a temperature probe 7 and associated temperature measuring system 8, a feedback controller 9, a gas/liquid separator 10, a product separator 12 and a reactor 916. The combustion zone 954 of reactor 916 fusions as an energy recovery unit by burning the hydrogen by-product of the reaction in air to provide heat to the reaction zone 26.

Figure 10:
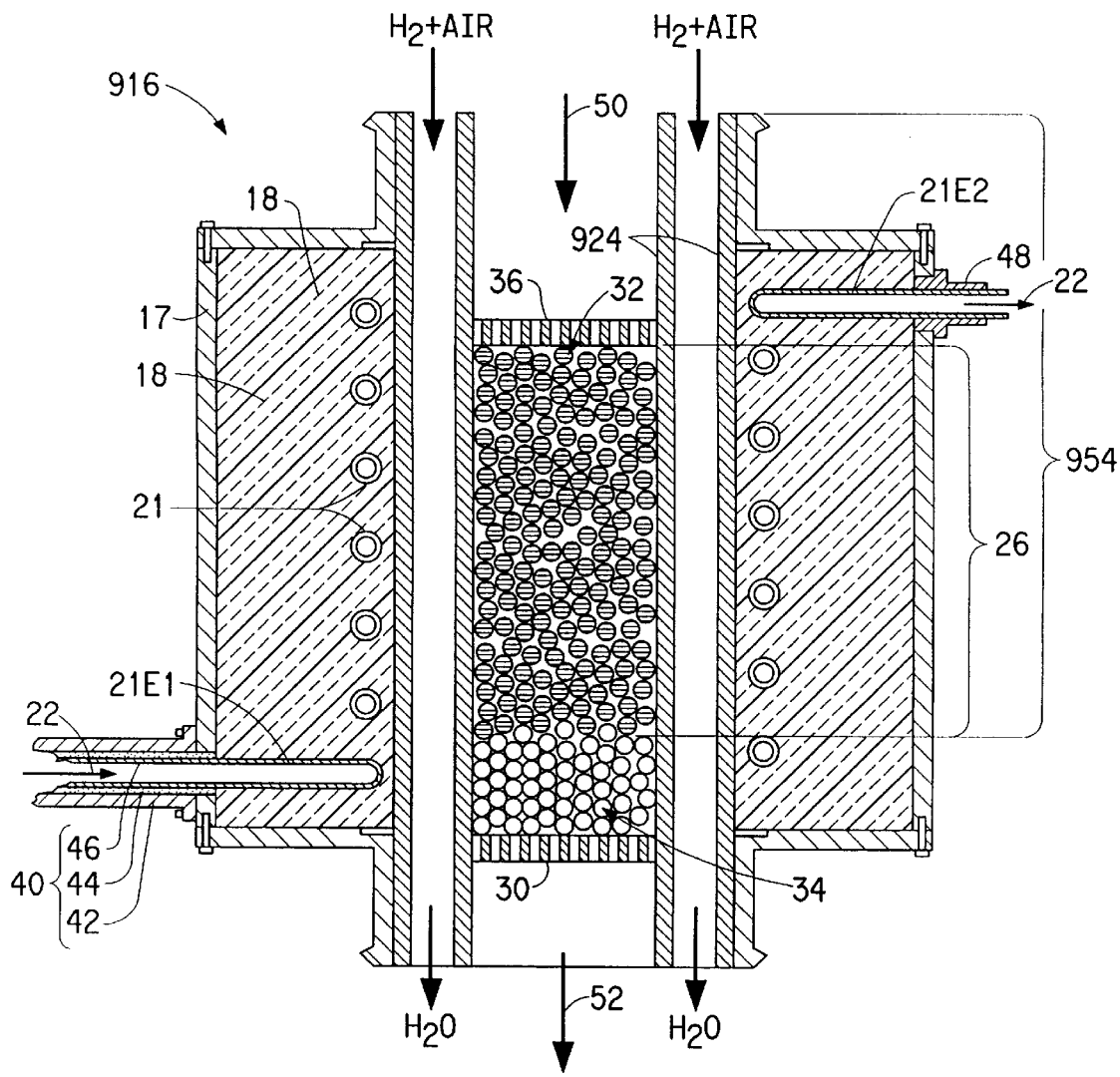
FIG. 10 is a schematic diagram showing a fourth reaction system.

FIG. 10 illustrates an embodiment of a reactor 916 arranged to exchange heat from an annular combustion zone 954 to reaction zone 26. Partition 924 comprises an inner wall which surrounds the reaction zone 26 and an outer wall, concentric to the inner wall which defines the annular combustion zone 954. The inner wall and the outer wall of partition 924 may be constructed of the sane material, as shown, such as all or may be constructed of different materials if desired. By-product hydrogen can be burned in the presence of air in combustion zone 954 so as to provide reaction zone 26 with a source of heat in addition to that provided by induction heating; in other words, it functions as an energy recovery unit.

While induction coil 21, e.g. FIG. 1, is illustrated as having a round cross-section and coils 321 and 421, FIGS. 3 and 4, are illustrated as having a flattened cross-section. in some instances, the coil can have a square or rectangular cross-section. Whereas suitable materials of construction for the various pieces of apparatus and associated equipment disclosed in the FIGS. 1–10 will be apparent to one skilled in the art, the following are examples of illustrative of materials of construction for the purposes of this invention. Reactor casing 17 can, for example, be made of carbon steel or stainless steel preferably the latter; outer jacket 42 and conductor 46 of the coaxial line can be made of copper or copper alloy and dielectric 44 thereof can be made of alumina ceramic. Ferrule 48 can be made of copper-containing alloy (i.e. an alloy in which copper is a major component or one in which copper is a minor component); provided however that the material of construction for ferrule 48 must be electrochemically compatible with the copper of coil 21 and steel of casing 17.

We claim:

1. A fluid phase reaction apparatus for producing a chemical product from a catalytic reaction that at least initially requires heat-input comprising a reaction zone having an inlet port and an outlet port, said zone containing an array of electrically conductive catalyst entities consisting of a core externally coated with a substantially uniform and complete catalyst metal or containing a catalytic metal as a foam and said catalyst entities being in close proximity to an induction heating device, an external source of alternating current electrical power connected to said induction heating device so as to create a region of high intensity field throughout said reaction zone, thereby heating said catalysts entities substantially uniformly.

2. A fluid phase reaction apparatus for producing a chemical product from a catalytic reaction that at least initially requires heat-input comprising an induction heating coil, an electrically non-conductive annular partition positioned concentrically within said induction coil, said partition defining a reaction zone containing a catalyst bed which comprises a three-dimensional array of electrically conductive catalyst entities consisting of a core externally coated with a substantially uniform and complete catalyst metal or containing a catalytic metal as a foam, an external source of alternating current electrical power connected to said induction heating coil so as to create a region of substantially uniform high intensity magnetic field within said reaction zone.

3. A fluid phase reaction apparatus for producing a chemical product from a reaction that at least initially requires heat-input comprising: A) an external reactor casing to contain reactants, said casing having an inlet port for conveying fluid reactants into the reactor and an outlet port for conveying fluid reaction products out of the reactor; B) a tubular induction heating coil positioned within said external casing; C) a first electrically non-conductive annular partition positioned within said induction heating coil; D) said first electrically non-conductive partition defining a reaction zone, said reaction zone being a region of high alternating magnetic field intensity within said induction heating coil and said reaction zone being in communication with said inlet port to receive fluid reactants and in communication with said outlet port to discharge fluids; E) a source of alternating current electrical power connected to said induction heating coil for creating said region of high intensity alternating magnetic field in the reaction zone by alternating magnetic induction; F) said reaction zone comprising a catalyst bed containing an array of discrete electrically conductive catalyst entities consisting of a core externally coated with a substantially uniform and complete catalyst metal or containing a catalytic metal as a foam; G) said catalyst entities being heated by said high intensity magnetic field which is created by said induction heating coil.

4. The apparatus of claim 3 wherein there is an annular thermal insulating region between said external casing and said induction heating coil.

5. The apparatus of claim 4 wherein said induction coil is positioned within said annular insulating region.

6. The apparatus of claim 4 wherein said annular thermal insulating region comprises a first inner annular ring of material which withstands high temperature and is chemically compatible with the fluids in the reaction zone and a second annular ring selected for its maximum heat-insulating properties.

7. The apparatus of claim 3 wherein the cross-section of said induction heating coil is shaped so as to minimize thermal conduction from said reaction zone.

8. The apparatus of claim 3 wherein the cross-section of said induction heating coil is shaped so as to maximize thermal conduction from said reaction zone.

9. The apparatus of claim 3 wherein said catalyst entities are supported within said reaction zone by support entities which are outside of said region of high intensity alternating magnetic field.

10. The apparatus of claim 9 wherein said support entities comprises electrically non-conductive entities.

11. The apparatus of claim 3 wherein said outlet port is in communication with a combustion unit.

12. The apparatus of claim 3 wherein said outlet port is in communication with a fuel cell.

13. The apparatus of claim 3 wherein said outlet port is in communication with a gas turbine.

14. The apparatus of claim 3 wherein said first electrically non-conductive annular partition is positioned within a second electrically non-conductive annular partition which is spaced axially from said first electrically non-conductive annular partition.

15. The apparatus of claim 3 wherein said outlet port is positioned within said inlet port.

* * * * *